(12) United States Patent
Taniuchi et al.

(10) Patent No.: US 11,735,799 B2
(45) Date of Patent: Aug. 22, 2023

(54) LITHIUM ION SECONDARY BATTERY

(71) Applicant: HONDA MOTOR CO., LTD., Tokyo (JP)

(72) Inventors: Takuya Taniuchi, Saitama (JP); Masahiro Ohta, Saitama (JP); Toshiyuki Ariga, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 228 days.

(21) Appl. No.: 17/202,317

(22) Filed: Mar. 15, 2021

(65) Prior Publication Data

US 2021/0296744 A1    Sep. 23, 2021

(30) Foreign Application Priority Data

Mar. 23, 2020 (JP) ................... 2020-050794

(51) Int. Cl.
*H01M 50/54* (2021.01)
*H01M 10/0585* (2010.01)
(Continued)

(52) U.S. Cl.
CPC ......... *H01M 50/54* (2021.01); *H01M 10/052* (2013.01); *H01M 10/0525* (2013.01);
(Continued)

(58) Field of Classification Search
CPC ........... H01M 10/052; H01M 10/0585; H01M 10/0525; H01M 50/54; H01M 50/536; H01M 50/538; H01M 50/533
(Continued)

(56) References Cited

U.S. PATENT DOCUMENTS

2012/0189899 A1    7/2012    Kanda et al.
2014/0271487 A1    9/2014    Fernandes et al.
(Continued)

FOREIGN PATENT DOCUMENTS

CN    202930467 U    5/2013
CN    108604660 A    9/2018
(Continued)

OTHER PUBLICATIONS

Office Action issued in the U.S. Appl. No. 17/206,101, dated Feb. 1, 2023.

*Primary Examiner* — James M Erwin
(74) *Attorney, Agent, or Firm* — CKC & Partners Co., LLC

(57) ABSTRACT

To provide a lithium ion secondary battery in which it is possible to prevent an electrode end part from cracking, when current collector tabs of the lithium ion secondary battery are bound to each other and joined to a lead terminal. A lithium ion secondary battery includes a lithium ion secondary battery main body and a lead terminal. The lithium ion secondary battery main body has a laminated body repeatedly disposed with positive electrodes respectively including positive electrode current collectors, solid electrolytes, and negative electrodes respectively including negative electrode current collectors. The current collectors respectively extend from an end face of the laminated body in an identical direction to constitute a plurality of current collector tabs. The lead terminal is electrically coupled to the plurality of current collector tabs. The current collector tabs and the lead terminal are coupled to each other via an electrically-conductive tab guiding part.

5 Claims, 3 Drawing Sheets

(51) Int. Cl.
   *H01M 10/0525* (2010.01)
   *H01M 50/536* (2021.01)
   *H01M 50/538* (2021.01)
   *H01M 50/533* (2021.01)
   *H01M 10/052* (2010.01)

(52) U.S. Cl.
   CPC ..... *H01M 10/0585* (2013.01); *H01M 50/533* (2021.01); *H01M 50/536* (2021.01); *H01M 50/538* (2021.01)

(58) Field of Classification Search
   USPC .......................................................... 429/162
   See application file for complete search history.

(56) References Cited

U.S. PATENT DOCUMENTS

| | | | |
|---|---|---|---|
| 2014/0272487 A1 | 9/2014 | Ishii et al. | |
| 2015/0340726 A1 | 11/2015 | Sasaki | |
| 2016/0285111 A1* | 9/2016 | Norton | H01M 10/425 |
| 2019/0013506 A1 | 1/2019 | Park | |
| 2019/0280280 A1* | 9/2019 | Xiao | H01M 50/538 |
| 2020/0028146 A1* | 1/2020 | Li | H01M 50/507 |
| 2020/0044275 A1* | 2/2020 | Kim | H01M 10/0587 |
| 2020/0067064 A1* | 2/2020 | Dai | B23K 11/315 |

FOREIGN PATENT DOCUMENTS

| | | |
|---|---|---|
| JP | H0799058 A | 4/1995 |
| JP | H08329954 A | 12/1996 |
| JP | 2000106154 A | 4/2000 |
| KR | 20160049827 A | 5/2016 |

* cited by examiner

LITHIUM ION SECONDARY BATTERY

This application is based on and claims the benefit of priority from Japanese Patent Application No. 2020-050794, filed on 23 Mar. 2020, the content of which is incorporated herein by reference.

BACKGROUND OF THE INVENTION

Field of the Invention

The present invention relates to a lithium ion secondary battery.

Related Art

Conventionally, lithium ion secondary batteries have been widely used as secondary batteries having high energy density.

A lithium ion secondary battery has a structure where a solid electrolyte (a separator) exists between a positive electrode and a negative electrode, and the battery is filled with a liquid electrolyte (an electrolytic solution).

Since the electrolytic solution in the lithium ion secondary battery is normally a flammable organic solvent, safety against heat may be a problem, in particular.

A solid-state battery using, instead of an organic-based liquid electrolyte, an inorganic-based solid electrolyte has been proposed (see Japanese Unexamined Patent Application, Publication No. 2000-106154).

Compared with a battery using an electrolytic solution, a solid-state battery using a solid electrolyte makes it possible to solve heat-related problems, and also makes it possible, through lamination, to respond to demands of increased capacity and voltage.

It is also possible to contribute to a compact package.

Even in a lithium ion secondary battery where either a liquid electrolyte or a solid electrolyte is used, positive electrodes respectively including positive electrode current collectors, solid electrolytes, and negative electrodes respectively including negative electrode current collectors are repeatedly laminated to each other. In this state, pluralities of current collector tabs of the positive and negative electrodes respectively extend in identical directions. After that the pluralities of current collector tabs are respectively bound to each other. After that, the pluralities of current collector tabs are coupled to lead terminals, and are thus integrated with an exterior body.

FIGS. 3A and 3B are views illustrating joining states each between a conventional lithium ion secondary battery main body and a lead terminal.

As illustrated in FIG. 3A, a plurality of current collector tabs 12a, 12b, 12c, and 12d extending from a lithium ion secondary battery main body 100 are bound to each other. After that, the plurality of current collector tabs 12a, 12b, 12c, and 12d are joined, through welding at a joining part 500, to a lead terminal 200.

In this case, distances between the current collector tabs and the lead terminal differ from each other depending on the lead terminal, i.e., the length of each of 12a and 12d is greater than the length of each of 12b and 12c. The current collector tabs disposed on both outer sides, which are identical in length to each other, may experience a larger tensile force, leading to cracks developing on the electrode end parts from which the current collector tabs respectively extend.

This tendency is observed significantly in particular when, as illustrated in FIG. 3B, the lead terminal 200 is shifted in position downward from the center.

In this case, since the largest tensile force is applied to the current collector tab 12a that is disposed on the uppermost part, cracks may easily develop on the electrode end part.

Note that, since, in a solid-state battery, electrodes themselves are solid, cracks may further easily develop on the electrode end part.

Furthermore, one proposed idea is to use, as current collectors respectively constituting a positive electrode and a negative electrode in a solid-state battery, electrically-conductive porous bodies made of metal having a thin mesh structure, for example.

The mesh structure is internally filled with an electrode composite material to increase, per unit area, an amount of active material in an electrode layer, contributing to a high-capacity battery.

One example metal for use in a current collector having a mesh structure as described above is foam metal.

The foam metal has a uniform micropore diameter and a wide surface area, and is thus advantageous for use as a current collector (see Japanese Unexamined Patent. Application, Publication Nos. H07-099058 and H08-329954).

When electrically-conductive porous bodies are used as current collectors, extended parts of the electrically-conductive porous bodies are respectively pressed to form electrically-conductive pieces serving as current collector tabs respectively extending from the current collectors. However, the electrically-conductive pieces are highly rigid and are less flexible, compared with metallic foil.

Therefore, when a tensile force or stress is applied, as illustrated in FIGS. 3A and 3B, not only may cracks develop at an electrode end part, but cracks may also easily develop at the current collector tab or the current collector tab may easily break.

Patent Document 1: Japanese Unexamined Patent Application, Publication No. 2000-106154
Patent Document 2: Japanese Unexamined Patent Application, Publication No. H07-099058
Patent Document 3: Japanese Unexamined Patent Application, Publication No. H08-329954

SUMMARY OF THE INVENTION

In view of the problems found in the related arts, an object of the present invention to prevent an electrode end part from cracking, when current collector tabs of a lithium ion secondary battery are bound to each other and joined to a lead terminal.

To solve the problems described above, the inventors of the present invention have actively reviewed a method of coupling to each other current collector tabs and a lead terminal, in a lithium ion secondary battery. As a result, the inventors have found that providing a tab guiding part having an electrically conductive property, between the current collector tabs and the lead terminal, makes it possible to solve the problems described above. The inventors have then completed the present invention.

Specifically, the present invention provides those described below.

(1) A lithium ion secondary battery including:
a lithium ion secondary battery main body having a laminated body repeatedly disposed with positive electrodes respectively including positive electrode current collectors, electrolyte layers, and negative electrodes respectively including negative electrode current collectors, the current collectors in at least either the positive electrodes or the negative electrodes respectively extending from an end face of the laminated body in an identical direction to constitute a plurality of current collector tabs, and a lead terminal electrically coupled to the plurality of current collector tabs, in which at least one of the current collector tabs and the lead terminal are coupled to each other via an electrically-conductive tab guiding part, and the electrically-conductive tab guiding part includes a cover part that cover the current collector tab and an extension part that extend from the cover part and that is coupled to an end side of the lead terminal.

(2) The lithium ion secondary battery described in (1), in which the extension part has flexibility.

(3) The lithium ion secondary battery described in (1) or (2), in which, in a state where a plurality of the extension parts are bound to each other, the plurality of the extension parts are coupled to the end side of the lead terminal.

(4) The lithium ion secondary battery described in any one of (1) to (3), in which a plurality of the cover parts are coupled to each other.

(5) The lithium ion secondary battery described in any one of (1) to (4), in which the lithium ion secondary battery main body is a solid-state battery.

(6) The lithium ion secondary battery described in any one of (1) to (5), in which the current collectors are made of electrically-conductive porous bodies, and the current, collector tabs are electrically-conductive pieces formed by pressing the electrically-conductive porous bodies.

According to the present invention, it is possible to prevent an electrode end part from cracking, when current collector tabs of a lithium ion secondary battery are bound to each other and are joined to a lead terminal.

DETAILED DESCRIPTION OF THE INVENTION

An embodiment of the present invention will now be described herein with reference to the accompanying drawings.

However, the embodiment described below merely exemplifies the present invention. The present invention is not limited to the below description.

Note that, to describe the embodiment below, a lithium ion solid-state battery is exemplified. However, the present invention is not limited to the example, but is applicable to those including lithium ion batteries that use a liquid electrolyte.

<Overall Configuration of Lithium Ion Secondary Battery>

An overall configuration of a lithium ion secondary battery according to the present invention will first be described with reference to FIGS. 1 and 2.

Figure 1:
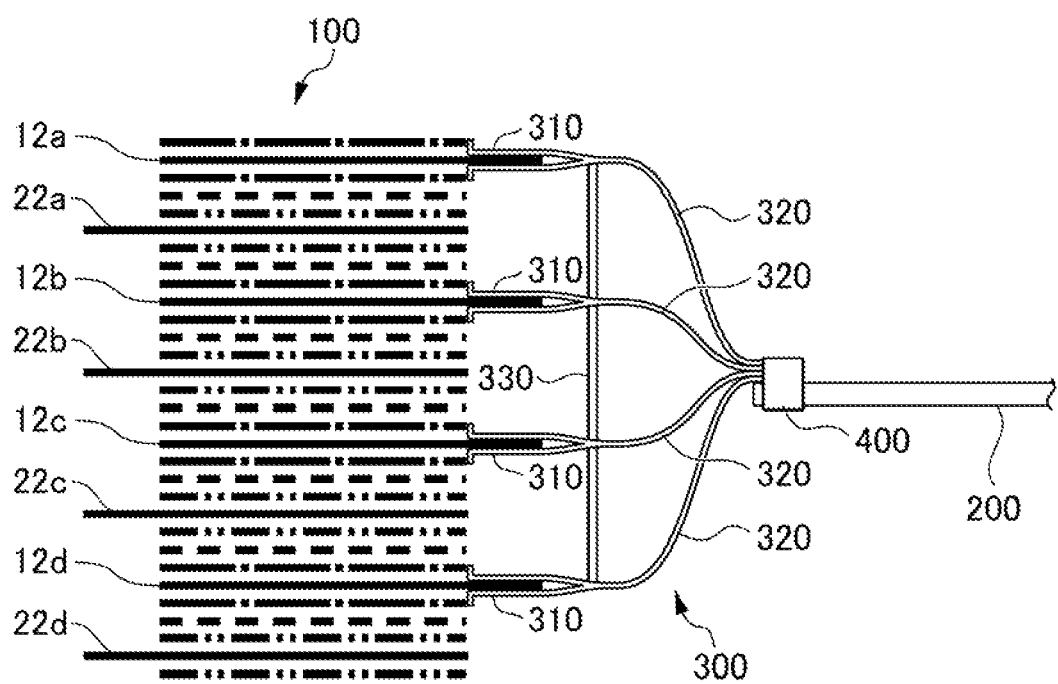
FIG. 1 is a schematic, side cross-sectional view illustrating a joining state between a lithium ion secondary battery main body and a lead terminal, according to a first embodiment of the present invention.

FIG. 1 is a schematic, side cross-sectional view illustrating a joining state between a lithium ion secondary battery main body 100 and a lead terminal 200, according to an embodiment of the present invention. FIG. 2 is an enlarged view of a portion around current collector tabs illustrated in FIG. 1.

As illustrated in FIG. 1, the lithium ion secondary battery includes the lithium ion secondary battery main body 100, the lead terminal 200, and an electrically-conductive tab guiding part 300. The lithium ion secondary battery main body 100 and the lead terminal 200 are coupled to each other via the electrically-conductive tab guiding part 300.

Figure 2:
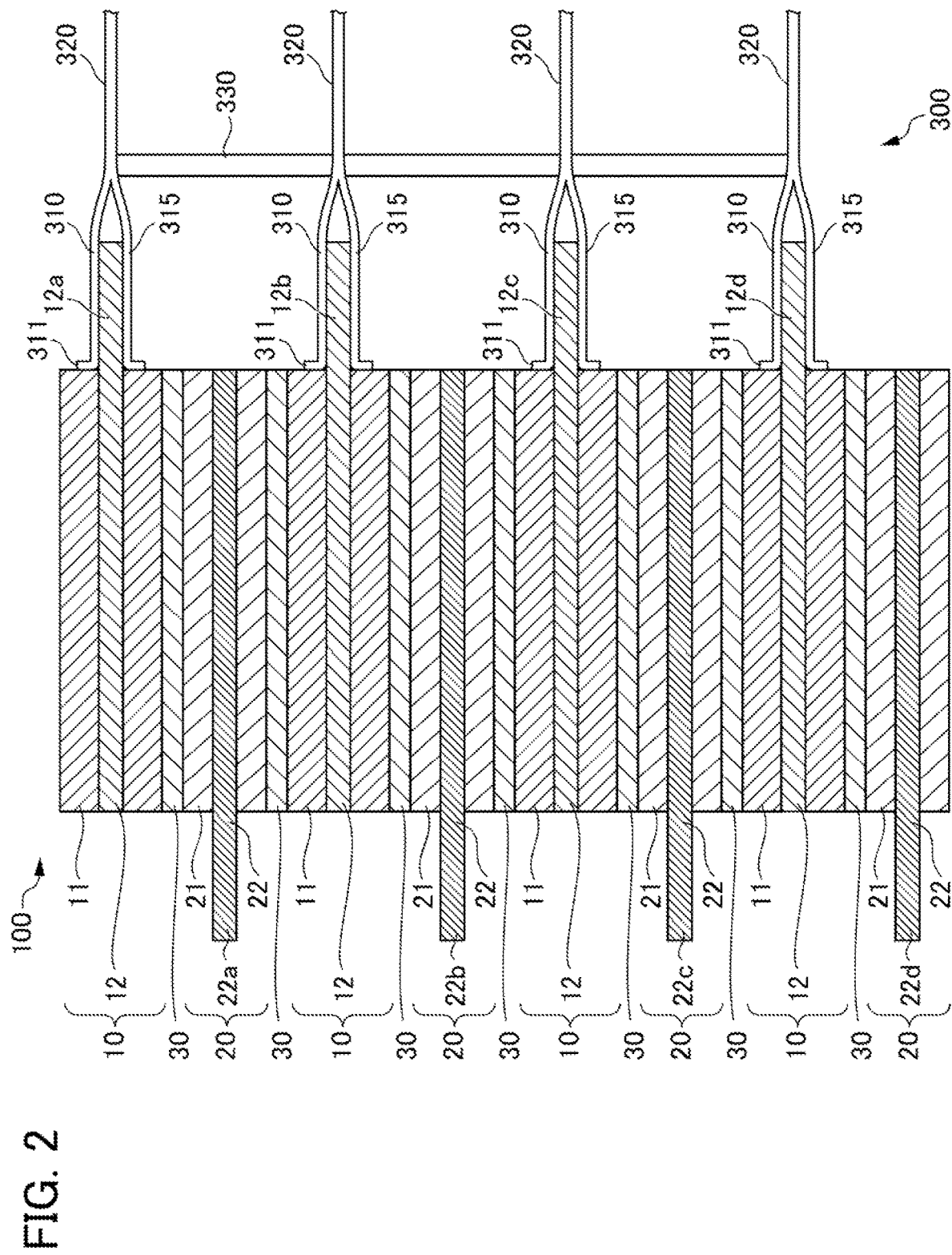
FIG. 2 is an enlarged view of a portion around current collector tabs illustrated in FIG. 1.
Figure 3A:
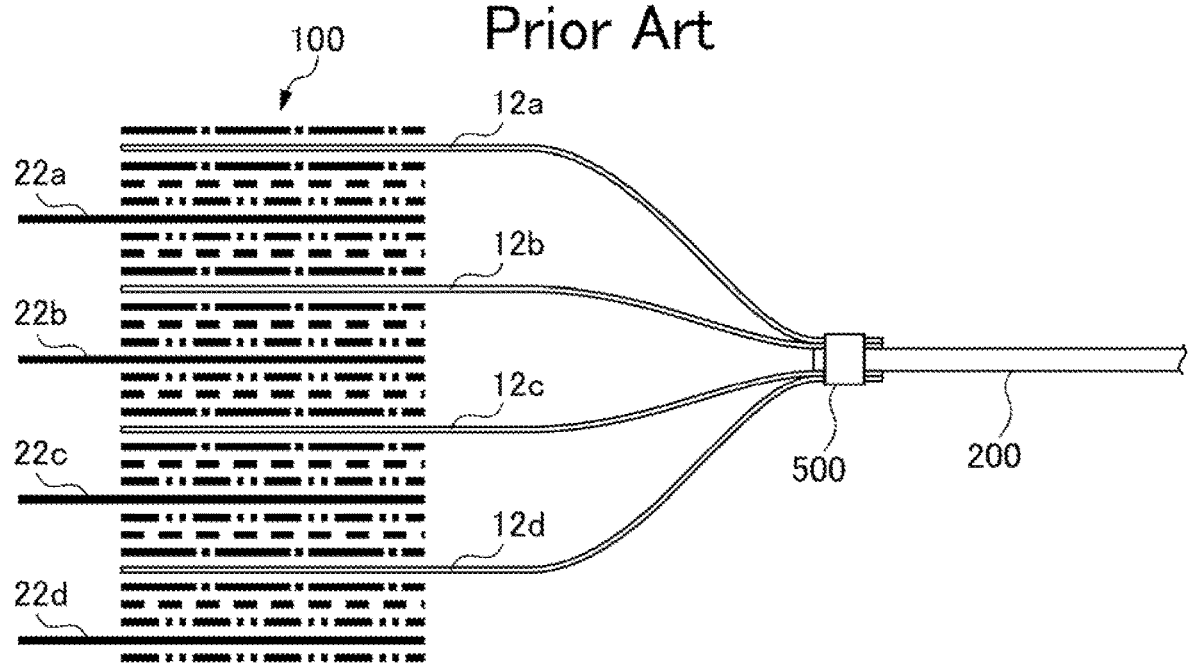
FIG. 3A is a schematic, side cross-sectional view illustrating, when a lead terminal is arranged on a center part, a joining state between a conventional lithium ion secondary battery main body and the lead terminal.
Figure 3B:
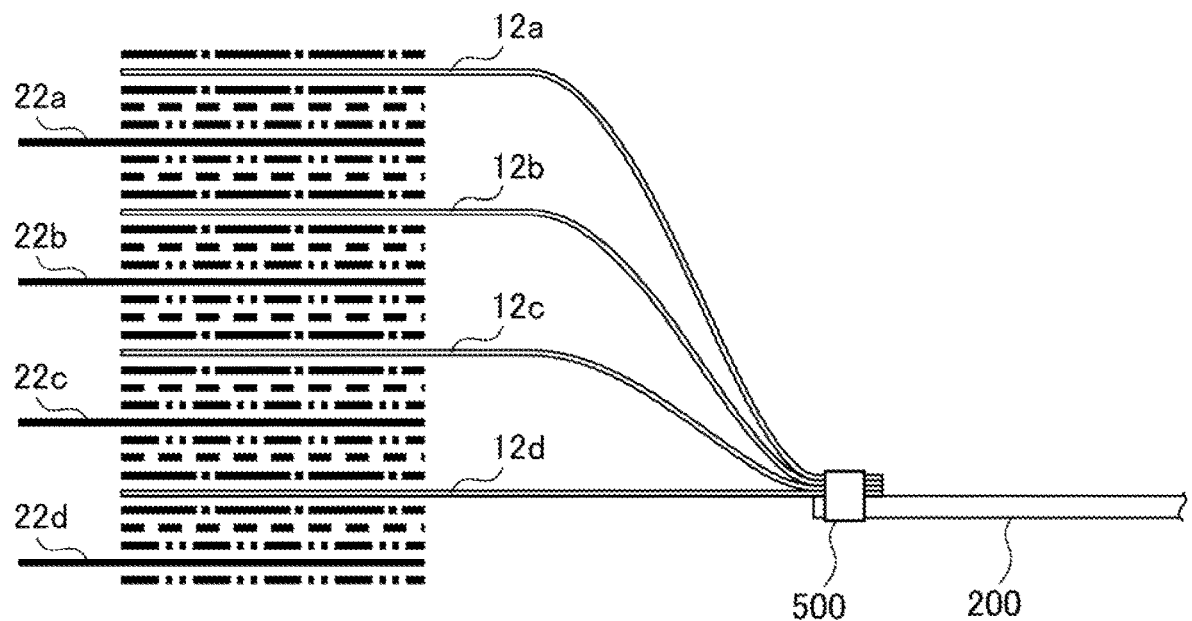
FIG. 3B is a schematic, side cross-sectional view illustrating, when a lead terminal is shifted downward, a joining state between a conventional lithium ion secondary battery main body and a lead terminal.

As illustrated in FIG. 2, the lithium ion secondary battery main body 100 has a laminated body having a structure where negative electrodes 10, positive electrodes 20, and solid electrolyte layers 30 respectively disposed therebetween are repeatedly laminated to each other.

The embodiment is an example where laminated layer units each of which includes a laminate of the negative electrode 10, the solid electrolyte layer 30, and the positive electrode 20, are further repeatedly laminated to each other four times.

In each of the negative electrodes 10, negative electrode active material layers 11 are laminated on both surfaces of a negative electrode current collector 12. In each of the positive electrodes 20, positive electrode active material layers 21 are laminated on both surfaces of a positive electrode current collector 22.

The layers may be separate layers. Otherwise, similar to an example of using electrically-conductive porous bodies described later, a negative electrode current collector and negative electrode active material layers may be integrated with each other.

[Negative Electrode Active Material Layer]

A negative electrode active material contained in the negative electrode active material layers 11 is not particularly limited. It is possible to apply a substance that is known to be used as a negative electrode active material for a solid-state battery.

Its composition is also not particularly limited. A solid electrolyte, an electrically conductive auxiliary agent, or a binding agent, for example, may be contained.

Examples of the negative electrode active material include lithium metals, lithium alloys such as Li—Al alloys and Li—In alloys, lithium titanates such as $Li_4Ti_5O_{12}$, and carbon materials such as carbon fiber and graphite.

[Negative Electrode Current Collector]

The negative electrode current collectors 12 are not particularly limited. It is possible to apply current collectors that are known to be used for negative electrodes for a solid-state battery.

Examples include metallic foils such as stainless steel (steel use stainless or SUS) foils and copper (Cu) foils.

[Positive Electrode Active Material Layer]

A positive electrode active material contained in the positive electrode active material layers 21 is not particularly limited. It is possible to apply a substance that is known to be used as a positive electrode active material for a solid-state battery.

Its composition is also not particularly limited. A solid electrolyte, an electrically conductive auxiliary agent, or a binding agent, for example, may be contained.

Examples of the positive electrode active material include transition metal chalcogenides such as titanium disulfide, molybdenum disulfide, and niobium selenide, and transition metal oxides such as lithium nickel oxide ($LiNiO_2$), lithium manganese oxide ($LiMnO_2$, $LiMn_2O_4$), and lithium cobalt oxide ($LiCoO_2$).

[Positive Electrode Current Collector]

The positive electrode current collectors 22 are not particularly limited. It is possible to apply current collectors that are known to be used for positive electrodes for a solid-state battery.

Examples include metallic foils such as stainless steel (steel use stainless or SUS) foils and aluminum (Al) foils.

[Current Collector Tab]

A plurality of negative electrode current collector tabs 12a, 12b, 12c, and 12d extend from an end face of the laminated body in an identical direction substantially parallel to each other to form a plane.

In this embodiment, the negative electrode current collectors 12 respectively extend to form the negative electrode current collector tabs.

A plurality of positive electrode current collector tabs 22a, 22b, 22c, and 22d similarly extend from another end face of the laminated body in an identical direction substantially parallel to each other to form a plane.

In this embodiment, the positive electrode current collectors 22 respectively extend to form the positive electrode current collector tabs.

Note that, in the present invention, it is enough that the current collector tabs respectively extend from the current collectors as a result. The present invention is not necessarily limited to the extended current collector tabs. Current collectors and current collector tabs may be different members.

A width of each of the current collector tabs is appropriately set to be equal to or less than a width of a composite material, in accordance with the purpose of use, to reduce resistance of each of current collector tab parts. The width preferably ranges from 1 mm to 1000 mm inclusive, and, more preferably, from 2 mm, to 300 mm inclusive.

Its thickness generally ranges from approximately 5 μm to approximately 50 μm inclusive. Its extension length generally ranges from approximately 5 mm to approximately 50 mm inclusive.

[Electrically-Conductive Piece Using Electrically-Conductive Porous Body]

In the present invention, it is possible to use electrically-conductive porous bodies as current collectors.

Examples of the electrically-conductive porous bodies include metallic porous bodies, and, preferably, metallic foam porous bodies (foam metal).

Examples of the metal include nickel, aluminum, stainless steel, titanium, copper, and silver.

It is possible to preferably use foamed aluminum as current collectors constituting positive electrodes. It is possible to preferably use foamed copper or foamed stainless steel as current collectors constituting negative electrodes.

Since foam metal has a three-dimensional mesh structure, it is possible to improve the capability of collecting current and the capability of holding an active material, compared with other conventional current collectors.

It is therefore possible to make thicker a composite material layer without increasing resistance, compared with a case when metallic foil is used as a current collector. As a result, it is possible to increase a capacity of each electrode per unit area.

Furthermore, since a degree of porosity of the foam metal is higher, compared with a metallic fiber sintered body, for example, it is possible to increase a filling amount of an active material. As a result, it is possible to increase the capacity of each electrode.

Air voids in the electrically-conductive porous bodies serving as current collectors are filled with the electrode composite material to constitute electrodes.

The electrode composite material contains the electrode active material and a solid electrolyte, and, preferably, further contains an organic high polymer compound (binder).

Other constituents are not particularly limited. Those constituents that can be used to produce an electrode for a solid-state battery may be optionally included.

When electrically-conductive porous bodies are used as current collectors, current collector tabs extend from the electrically-conductive porous bodies.

At this time, the extended parts respectively at least contain the electrically-conductive porous bodies. The extended parts may or may not be filled with an electrode composite material.

The extended parts are pressed, through a predetermined pressing method such as roll pressing to each have a predetermined thickness and a predetermined width. In the extended parts, air voids are compressed to respectively form electrically-conductive pieces. The electrically-conductive pieces thus serve as current collector tabs.

In the electrically-conductive pieces, the current collector tabs themselves each have rigidity and do not have flexibility, compared with foil.

Therefore, a characteristic of each of the current collector tabs themselves is that the current collector tabs easily crack.

[Lead Terminal]

The lead terminal. 200 has an end side and another end side. The end side is electrically coupled, through welding, to extension parts 320 of the electrically-conductive tab guiding member 300, on a side adjacent to the lithium ion secondary battery main body 100. The other end side extends from a non-illustrated exterior body such as a laminate film to form an electrode part of the exterior body.

The lead terminal 200 is not particularly limited. The lead terminal 200 is, preferably, a thin plate member that is made of aluminum (Al) or copper (Cu) having flexibility, for example, and that extends in an extending direction.

Generally, a thickness of the lead terminal 200 ranges from approximately 0.05 mm to approximately 5 mm inclusive. The thickness is thicker than the thickness of each of the current collector tabs.

<Coupling Structure Between Lithium Ion Secondary Battery Main Body and Lead Terminal>

As illustrated in FIG. 1, the lithium ion secondary battery includes the lithium ion secondary battery main body 100, the lead terminal 200, and the electrically-conductive tab guiding member 300.

The lithium ion secondary battery main body 100 and the lead terminal 200 are coupled to each other via the electrically-conductive tab guiding part 300.

Note that, although a coupling structure on a positive electrode side is omitted in FIG. 1, it is also possible to apply a similar coupling structure on the positive electrode. In the present invention, it is possible to apply a coupling structure described below on one of or both of the positive and negative electrode sides.

The negative electrode current collector tabs 12a, 12b, 12c, and 12d in FIG. 1 extend, as described above, from the end face of the laminated body in an identical direction substantially parallel to each other to form a plane.

The number of the negative electrode current collector tabs is appropriately set in accordance with the number of repetitions of the laminated layer units described above.

[Electrically-Conductive Tab Guiding Part 300]

(Cover Part)

As illustrated in FIGS. 1 and 2, the electrically-conductive tab guiding part 300 includes cover parts 310 each having a cylindrical shape and the extension parts 320 respectively extending from diameter-reduced parts of the cover parts 310.

In the present invention, the cover parts 310 and the extension parts 320 may not be necessarily integrated with each other, but may be separate members.

The cover parts 310 respectively have body parts 315 each wholly have a flat cylindrical shape with which it is possible to substantially wholly cover the current collector tab. Respective end sides of the body parts 315 are provided with opening parts. Ribs 311 are respectively formed around the opening parts.

The ribs 311 of the cover parts 310 are respectively in contact with the end face of the laminated body constituting the lithium ion secondary battery main body 100, ensuring the joining with the end face.

Note that an insulating treatment using resin, for example, may be applied between the ribs 311 and the end face.

The body parts 315 are respectively and preferably, after being inserted from tip parts of the current collector tabs, joined to the current collector tabs through press fitting, for example.

Therefore, the body parts 315 and the current collector tabs are securely and electrically coupled to each other.

Furthermore, the cover parts 310 physically protect the current collector tabs, making it possible to prevent the current collector tabs from moving in upper and lower directions and breaking, and to mitigate a larger tensile force if applied.

Therefore, the cover parts 310 each preferably have predetermined rigidity.

Examples of the electrically-conductive material constituting the cover parts 310 can include aluminum foils, copper foils, and stainless steel foils each having a thickness ranging from 0.05 mm to 0.5 mm inclusive.

Note that, although not illustrated, areas around the body parts 315 and the ribs 311 may be sealed with resin such as electrically-insulating resin.

Furthermore, the cover parts 310 may not necessarily each have a cylindrical shape to wholly cover the current collector tabs, respectively. In one aspect, the cover parts 310 may each have a plate shape or a U shape to partially cover the current collector tabs, respectively.

(Extension Part)

On other end sides of the body parts 315, respective diameters are gradually reduced, and are thus closed. Respective portions extending from there constitute the extension parts 320.

The extension parts 320 each have, similar to the current collector tabs, a ribbon shape, a plate shape, or a foil shape. The extension parts 320 respectively extend to the end side of the lead terminal 200, and are joined, through welding, for example, to the end side of the joining part 200.

The extension parts 320 preferably have flexibility.

In this case, it is therefore possible to mitigate stress if applied to the electrodes, to bind the plurality of current collector tabs, and to easily achieve joining to the joining part 200.

Examples of the electrically-conductive material constituting the extension parts 320 can include aluminum foils, copper foils, and stainless steel foils each having a thickness ranging from 0.05 mm to 0.5 nm inclusive.

(Coupling Part)

In the embodiment, the electrically-conductive tab guiding part 300 is used for all the four current collector tabs 12a, 12b, 12c, and 12d. The cover parts 310 are linearly coupled to each other via the coupling part 330 across the lithium ion secondary battery main body 100 in a thickness direction.

Therefore, the four cover parts 310 are integrated with each other, preventing the cover parts 310 from each moving individually.

For the coupling part 330, it is possible to use a material similar to the material of the cover parts 310 and the extension parts 320.

Note that, in the present invention, the electrically-conductive tab guiding part 300 may not be used for all the current collector tabs. The electrically-conductive tab guiding part 300 may only be used for particular current collector tabs, such as the tabs of the electrodes that may particularly easily crack.

Furthermore, in the present invention, the electrically-conductive tab guiding part 300 may not be used for all the current collector tabs. The electrically-conductive tab guiding part 300 may only be used for particular current collector tabs, such as the tabs of the electrodes that may particularly easily crack.

(Joining Part)

The plurality of extension parts 320 are then bound to each other, with a conventionally known binding means (not illustrated) such as a binding plate or a binding roll.

Note that, the term binding means binding (or convergence) when seen in the side view in FIG. 1. In this embodiment, the term binding means that the extension parts 320 forming a plane are stacked and laminated to each other.

The plurality of extension parts 320 after being bound to each other extend toward the lead terminal 200 in a bound state or a substantially bound state.

At a position overlapping with the end side (adjacent to the lithium ion secondary battery main body 100) of the lead terminal 200, a joining part 400 is formed.

That is, at the second joining part 400, the plurality of extension parts 320 bound to each other and the lead terminal 200 are joined to each other.

The term joining used in the present invention means in a broad sense joining including welding. Welding is a joining method including, fusion welding, press fitting, and brazing, where joining parts of two or more members are applied with one of or both of heat and pressure, and are further added with an appropriate welding material if necessary to integrally couple the joining parts to each other to form one continuous member.

According to the present invention as described above, coupling to each other a lead terminal and current collector tabs of a lithium ion secondary battery main body via an electrically-conductive tab guiding part makes it possible to reduce stress applied to the current collector tabs, preventing electrodes from cracking.

Furthermore, using an electrically-conductive tab guiding part makes it possible to shorten each of electrically conductive tabs to a constant length, to achieve the coupling to a variously-disposed lead terminal, and to increase a degree of coupling freedom.

Furthermore, the present invention is effective for a lithium ion solid-state battery including solid electrodes that accordingly easily crack.

In particular, when current collector tabs are electrically-conductive pieces acquired by pressing electrically-conductive porous bodies, the current collector tabs themselves have rigidity, but do not have flexibility.

Therefore, the current collector tabs themselves easily crack. Even in this case, in particular, the present invention is advantageously applied.

EXPLANATION OF REFERENCE NUMERALS

10 Negative electrode
11 Negative electrode active material layer
12 Negative electrode current collector
12a, 12b, 12c, 12d Negative electrode current collector tab
20 Positive electrode
21 Positive electrode active material layer
22 Positive electrode current collector
22a, 22b, 22c, 22d Positive electrode current collector tab
30 Solid electrolyte layer
100 Lithium ion secondary battery main body
300 Electrically-conductive tab guiding part
310 Cover part
311 Rib
315 Body part
320 Extension part
330 Coupling part
400 Joining part

What is claimed is:

1. A lithium ion secondary battery comprising:
a lithium ion secondary battery main body having a laminated body repeatedly disposed with positive electrodes respectively including positive electrode current collectors, electrolyte layers, and negative electrodes respectively including negative electrode current collectors, the current collectors in at least either the positive electrodes or the negative electrodes respectively extending from an end face of the laminated body in an identical direction to constitute a plurality of current collector tabs; and
a lead terminal electrically coupled to the plurality of current collector tabs,
wherein
at least one of the current collector tabs and the lead terminal are coupled to each other via an electrically-conductive tab guiding part, and
the electrically-conductive tab guiding part includes a plurality of cover parts that cover the plurality of current collector tabs and a plurality of extension parts that extend from the plurality of cover parts and that are coupled to an end side of the lead terminal, the plurality of the extension parts being coupled to the end side of the lead terminal in a state where the plurality of the extension parts are bound to each other.

2. The lithium ion secondary battery according to claim 1, wherein the extension part has flexibility.

3. The lithium ion secondary battery according to claim 1, wherein the plurality of the cover parts are coupled to each other.

4. The lithium ion secondary battery according to claim 1, wherein the lithium ion secondary battery main body is a solid-state battery.

5. A lithium ion secondary battery comprising:
a lithium ion secondary battery main body having a laminated body repeatedly disposed with positive electrodes respectively including positive electrode current collectors, electrolyte layers, and negative electrodes respectively including negative electrode current collectors, the current collectors in at least either the positive electrodes or the negative electrodes respectively extending from an end face of the laminated body in an identical direction to constitute a plurality of current collector tabs; and
a lead terminal electrically coupled to the plurality of current collector tabs,
wherein
at least one of the current collector tabs and the lead terminal are coupled to each other via an electrically-conductive tab guiding part,
the electrically-conductive tab guiding part includes a cover part that covers the plurality of current collector tabs and an extension part that extends from the cover part and that is coupled to an end side of the lead terminal,
the current collectors are made of electrically-conductive porous bodies, and the plurality of current collector tabs are electrically-conductive pieces formed by pressing the electrically-conductive porous bodies.

* * * * *